United States Patent [19]
Bohanec

[11] 3,741,092
[45] June 26, 1973

[54] CAMERA STRAP RETRACTOR
[76] Inventor: August Bohanec, 44 N. Mentor Avenue, Pasadena, Calif. 91101
[22] Filed: Aug. 12, 1971
[21] Appl. No.: 171,265

[52] U.S. Cl.................. 95/86, 224/5 V, 242/107
[51] Int. Cl. ........................................ G03b 17/56
[58] Field of Search.................. 224/5 V; 95/86; 242/107, 107.4

[56] References Cited
UNITED STATES PATENTS
3,323,750 6/1967 Worth et al.................. 242/107.4
3,547,371 12/1970 Gruseck.................. 242/107 R
3,632,058 1/1972 Stoffel.................. 242/107.4

FOREIGN PATENTS OR APPLICATIONS
533,744 6/1931 Germany.................. 224/5 V Primary Examiner—Samuel S. Matthews
Assistant Examiner—E. N. Bero
Attorney—Leo J. Young

[57] ABSTRACT

A carrying strap accessory for a camera provides for automatic retraction of a flexible carrying strap. The accessory includes a pair of adapters each having a connector which mates with one of the conventional eye connectors provided as a standard feature on most existing camera housings. A pair of rigid strap connectors are attached to opposite ends of the flexible strap. Each strap connector is rotatable relative to an associated adapter about an axis defined by a boss projecting outwardly from the adapter and disposed in a receptacle in the strap connector. A spring bias mechanism connected between the adapter and the strap connector provides the driving force to retract the flexible strap. Stop means are provided to prevent rotation beyond a prefixed angle so that the strap does not spin around the camera case.

11 Claims, 5 Drawing Figures

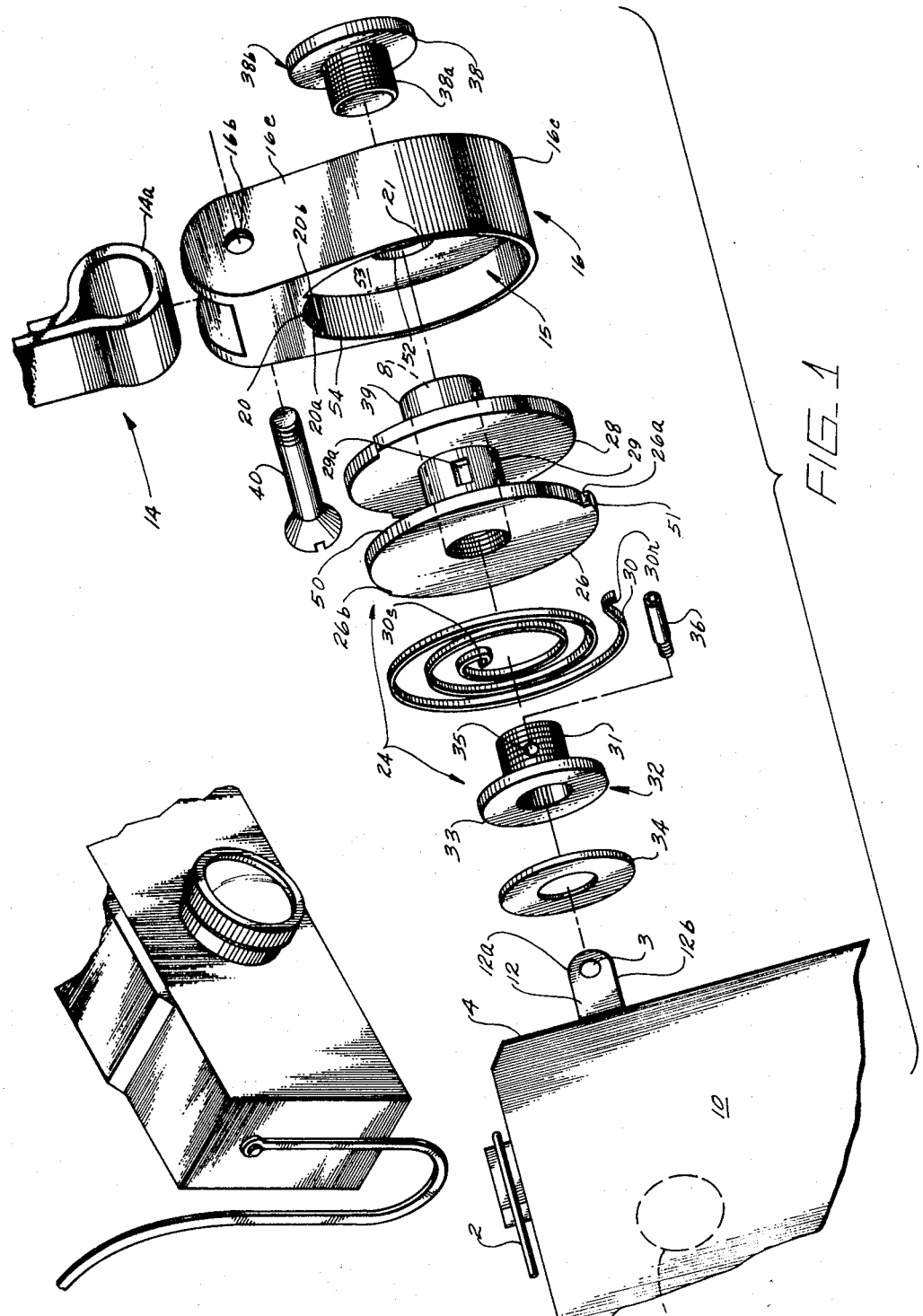

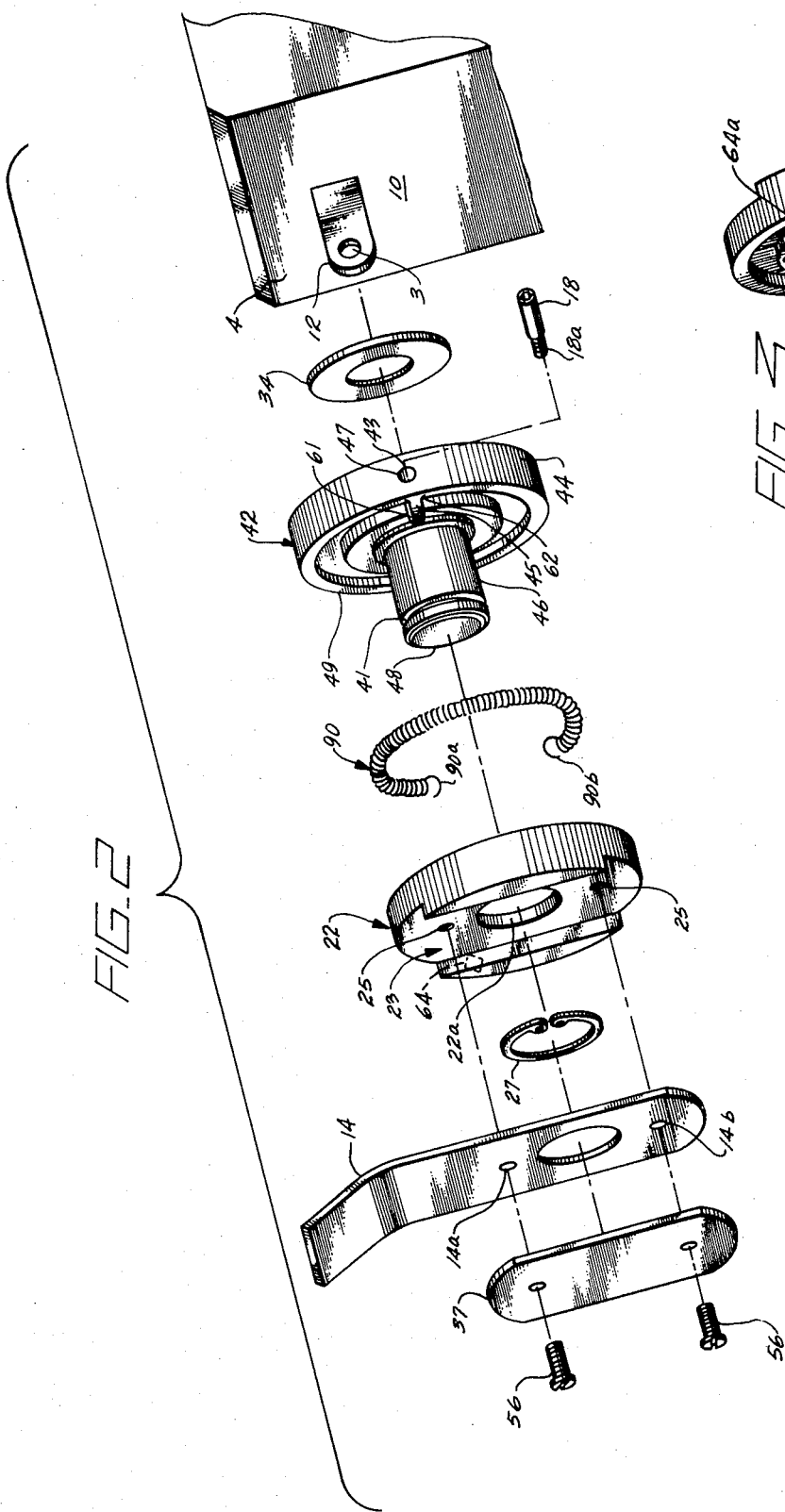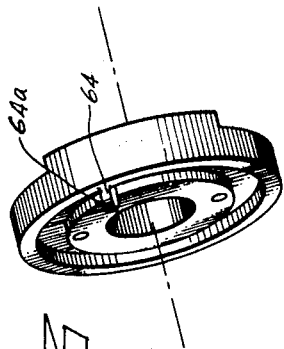

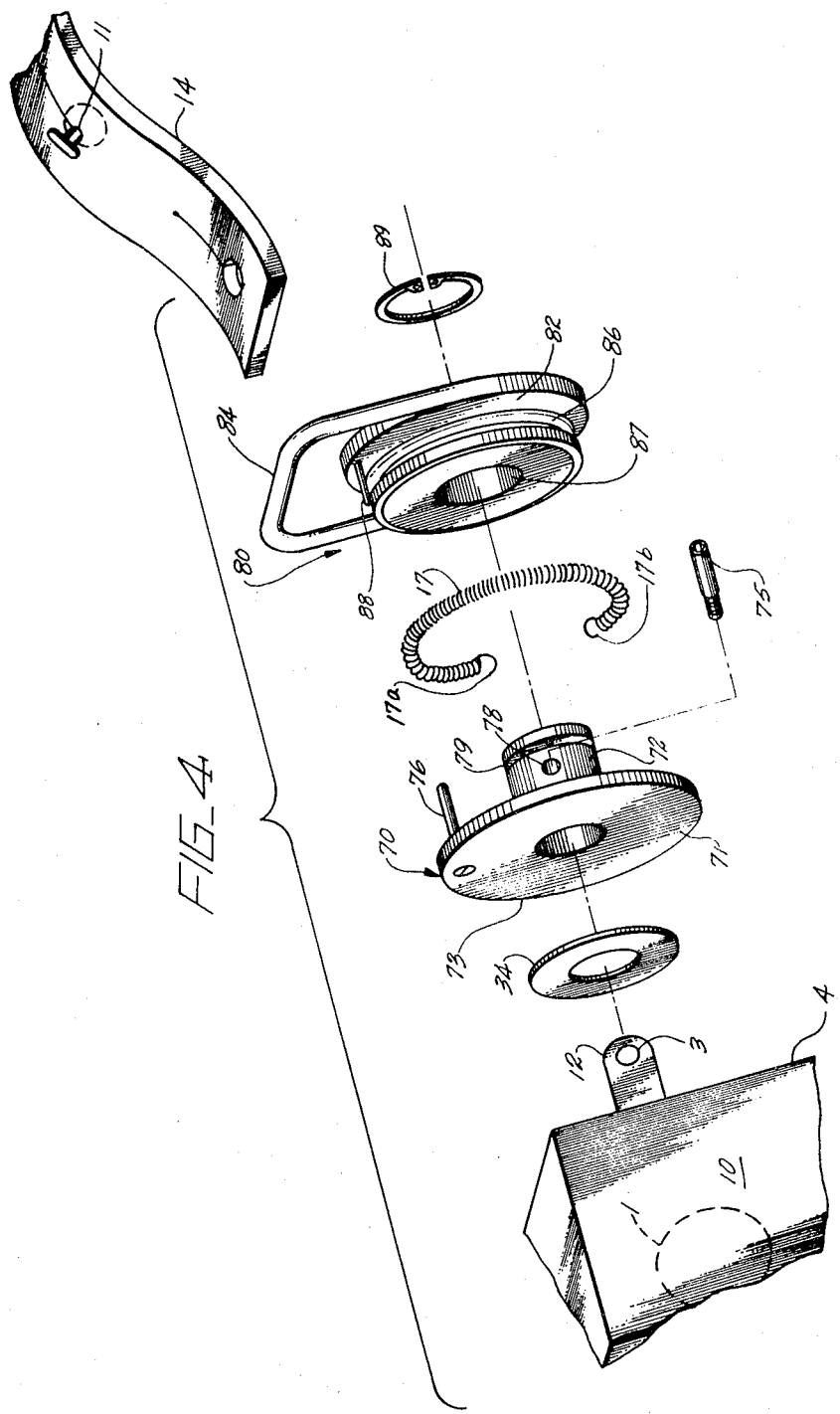

CAMERA STRAP RETRACTOR

BACKGROUND OF THE INVENTION

1. Field of the Invention

This invention relates generally to a carrying strap accessory for a camera and, more particularly, to automatically retracting apparatus for connecting a flexible strap to a camera body.

2. Description of the Prior Art

The flexible straps connected to conventional eye connectors on camera bodies are a great aid to the photographer while he is carrying the camera, but frequently are a nuisance while he is taking a picture. One problem attendant flexible straps manifests itself when the photographer picks up the camera from a table and tries to take a picture quickly. Since the carrying strap is not held upright, it droops in front of the camera lens and obscures the field of view. In the range finder viewer type of camera, the photographer will not see the strap while he is composing the picture and consequently his picture may be flawed. Another problem occurs when the photographer has the carrying strap looped around his neck and he raises the camera from his waist to eye height to look through the viewfinder and take a picture. Because the flexible strap is loose while the camera is at eye height, the strap flops around and intefers with immediate access to the cocking mechanism and the shutter release. Thus the photographer has to take the time to grab the attached end of the flexible strap and hold it in a convenient position and as a result he may lose the opportunity to take a picture quickly.

Since an enormous number of camera bodies and flexible straps have already been marketed it is desirable to provide a device for solving these problems which is adapted to fit the existing camera bodies, is easy to install, and, preferably is both economical and attractive looking.

While retraction devices are known, the prior art retraction devices have been adapted for retracting rigid handles such as suitcase handles and the like rather than flexible straps. Furthermore, the prior art retraction devices are a part of an overall assembly and are not adapted to be installed as an accessory.

SUMMARY OF THE INVENTION

This invention is directed to a carrying strap accessory adapted to connect a flexible strap to the conventional eye connectors on the body of a camera and which is automatically operable when the strap is released to move the strap out of the field of view of the camera lens.

In the preferred embodiment, the invention includes an adapter for connecting to a conventional eye connector so that the accessory can be employed on existing camera equipment. A rigid strap connector is attached to an end of the flexible strap. For an embodiment having a relatively short hand-type strap, the strap is sufficiently long to extend from one eye connector around the bottom of the camera body to the other eye connector. When positioned beneath the camera body the camera strap is completely out of the field of view of the camera lens and cannot flaw the picture. Preferably, the carrying strap is a relatively long or shoulder type strap and is sufficiently flexible so that its opposite end portions can be positioned to extend downwardly beside opposite sides of the camera and bend up in a U-shape so that the intermediate portion of the strap can be positioned around the photographer's neck. The strap connector includes a receptacle for rotatable mounting over a boss projecting outwardly from the adapter and the strap connector is rotatable relative to the boss through an angle sufficient to move the strap down into alignment with the side of the camera body. A spring bias mechanism is connected between the adapter and the strap connector to urge the strap connector to rotate in a prefixed direction.

A feature of the invention resides in a stop mechanism for stopping the retraction of the strap connector at a prefixed position so that the strap does not spin around the camera.

In using the preferred embodiment of the invention, the intermediate portion of the flexible strap is looped over the photographer's neck, opposite end portions of the strap are upright and support the camera which hangs in front of the photographer's chest, and the weight of the camera orients each strap connector relative to its mating boss to a predetermined angle and thereby preloads the spring bias mechanism. When the photographer lifts the camera to eye height to compose a picture, each spring bias mechanism forces its associated strap connector to rotate and the attached end portion of the flexible strap pivots until it is aligned with a side of the camera body so that the photographer has immediate and easy access to the camera controls such as the cocking mechanism and shutter release.

BRIEF DESCRIPTION OF THE DRAWINGS

FIG. 1 is an exploded perspective view illustrating the preferred embodiment of the present invention;

FIG. 1A is a sketch illustrating the orientation of an end portion of the flexible strap relative to the camera while the camera is being used and shows the upwardly opening U-shaped bend in the flexible strap;

FIG. 2 is an exploded perspective view illustrating an alternative embodiment of the present invention;

FIG. 3 is a perspective view of the end cap 22 showing its inwardly facing surface which is not visible in FIG. 2; and FIG. 4 is an exploded perspective view illustrating a third embodiment of the present invention.

DETAILED DESCRIPTION

In FIG. 1, a fragment of the side of a camera body or housing 10 which is parallel to and behind the film plane is shown. The camera body includes a cocking arm 2 on its top side, a lens mounting hole 1 on its front side, and a pair of conventional eye connectors 12 (only one shown), each mounted on an opposite end side 4 of the camera body. Eye connector 12 has parallel, substantially U-shaped, spaced-apart surfaces 12a and 12b with the curved portion of the U projecting outwardly from the camera body and has a circular bore 3 between the surfaces. As shown in FIG. 1, the axis of the circular bore 3 lies in a plane parallel to the central line of sight of the lens which mounts in the lens mounting hole 1. In most types of camera bodies the eye connector is mounted on a chamfered side of the camera body and the axis of the circular bore is at about a 45° angle to the lens line of sight.

A circular washer 34, preferably made of rubber or other resilient material and having a thickness corresponding to the distance between the camera body and the vertical tangent to circular bore 3 slides over and encircles the eye connector 12. Circular washer 34 provides for shock absorption and protects the finish on the portion of camera body adjacent to the eye connector.

An eye connector adapter assembly shown generally at 24 has two portions, the first portion being a hollow aluminum bolt 32 having a circular flange portion 33 which seats flush against washer 34, an externally threaded cylindrical portion 31 which projects outwardly from the camera, and a pair of axially aligned bores 35 (only one visible) extend diametrically through the cylindrical portion 31. One of the aligned bores is threaded. A pin 36, preferably made of brass or steel has one end threaded and is inserted through the bores 35 and the bore 3 to fix bolt 32 in place over the eye connector 12 and together with washer 34 serves to prevent bolt 32 from wobbling with respect to the camera body. The threaded end of bolt 32 mates with the threaded bore 35.

Adapter assembly 24 has a second portion, preferably made of brass or steel, which includes interior disk 26, exterior disk 28 and cylindrical spacer 29 integral with and joining the disks 26 and 28. Also included is a boss 39 projecting outwardly from exterior disk 28. A bore 8 extends through this second portion and carries internal threads for mating with bolt 32 from the interior side and for receiving a retaining bolt 38 from the exterior side.

Interior disk 26 has circumferential edge wall 50 radially spaced a first distance from the axis of the bore 8 and subtending an angle of about 160°, a circumferential edge wall 51 radially spaced a second, closer distance from the axis of the bore 8 and subtending substantially the remainder of the circle, and a pair of opposite shoulders 26a and 26b joining walls 50 and 51 with shoulder 26a being located rearwardly of the camera lens when the adapter assembly is in place.

Cylindrical spacer 29 has a substantially rectangular slot 29a located intermediate the two disks for receiving an interior, hooked end 30s of an open wound, flat, spiral spring 30 which is wrapped around the spacer 29. Although for purposes of showing an exploded, perspective view, spring 30 is shown to the left of interior disk 26, the spring is actually disposed between the two disks 26 and 28.

Exterior disk 28 is similar in shape to interior disk 26 except that its larger diameter circumferential edge wall subtends an angle of about 300°.

Strap connector 16, preferably made of aluminum for lightweight and attractive appearance has an end portion 16e and an integral collar portion 16c. End portion 16e is open to receive a looped end 14a of an elongated, flat, flexible carrying strap 14, a fragmentary portion of which is shown in its carrying position above end portion 16e. Preferably carrying strap 14 is nylon but can be leather, fabric or the like and is long enough to extend from one eye connector to the other. A pin 40 is inserted through transversely aligned bore 16b of each end portion 16e (only one shown) located adjacent the strap receiving opening in end portion 16e and through the looped end 14a of the strap to attach the strap to the strap connector 16. Preferably pin 40 is brass plated and includes an externally threaded portion which screws into internal threads carried by one side of the bore 16b.

Collar portion 16c has a receptacle shown generally at 15 for receiving the proximate side of adapter assembly 24. An interior wall 52 defines a cylindrical opening 21 and provides a bearing surface for rotatable mounting of the strap connector over the boss 39. An interior annular surface 53 perpendicular to the axis of cylindrical opening 21 faces the disk 28. An interior wall 54 defines a cylinder having a diameter large enough to receive the disks 26 and 28 and includes an integral key 20 having shoulders 20a and 20b. Key 20 is located circumferentially on wall 54 near the end portion 16e and extends longitudinally part way into receptacle 15 and is shaped to permit the smaller diameter end wall of disk 28 to slide under it during assembly. The outer hooked end 30r of spring 30 grips shoulder 20a of key 20. Retaining bolt 38 has an annular flange portion 38b and an externally threaded shaft portion 38a and screws into the internal threads of the bore 8 to hold the strap connector 16 to the adapter assembly 24.

When the strap 14 is raised into its carrying position and placed in tension by the weight of the camera, strap connector 16 rotates counter-clockwise about the axis shown in FIG. 1 and the adapter assembly 24 remains stationary with respect to the camera. Shoulder 20a of tab 20 acts against the kinked end 30r of the spring 30 to tighten the spring. When the tension is removed from the strap by releasing it or by lifting the camera the end portion of the strap 14 because, the spring bias force automatically rotates the strap connector 16 clockwise in the aspect of FIG. 1; eventually, shoulder 20b of tab 20 butts against shoulder 26a of disk 26 thereby stopping the rotation at a prefixed angle and preventing spin-around of the strap. Preferably, as shown in FIG. 1A, when the strap connector is at this prefixed angle, the end portion of strap 14 is aligned parallel to the end side 4 of the camera and projects downwardly out of the way of access to cocking mechanism 2. Since the strap is flexible it will bend in an upwardly opening U shape while the intermediate portion of the strap is disposed around the photographer's neck.

In FIG. 2, an alternative embodiment of the present invention is illustrated in an exploded perspective view showing a fragment of the front or lens mounting side of camera body 10. The camera body has a conventional eye connector 12 mounted on an end side 4 which would be gripped by the right hand of the photographer. A circular rubber washer 34 fits over the eye connector as in FIG. 1.

A brass plated adapter 42 includes a disk portion 44, a boss portion 46 centrally aligned with the disk portion; and an axial bore 48 extends through the adapter. Adapter 42 slips over the eye connector with the boss projecting outwardly from the camera and a flat annular surface portion (not visible) of the disk 44 abuts the washer 34. A bore 47 extends diametrically into the disk from an entry hole 43 and leads to a smaller diameter internally threaded bore (not shown) at the back of the adapter as viewed in FIG. 2. An elongated brass pin 18 having a smaller diameter externally threaded tip 18a is inserted through bore 47 and the bore 3 of the eye connector and is screwed in to attach the adapter 42 to the camera.

A substantially annular groove 49 in the disk portion 44 on the boss side of the adapter is spaced radially from the axis of the boss and as viewed in FIG. 2 extends circumferentially from an end just above the entry hole 43 almost a full circle to an end just below the entry hole 43. A stop tab 45 integral with the adapter 42 joins the two ends of the groove 49 and projects outwardly in the same direction as the boss and provides shoulders 61 and 62.

An aluminum generally disk shaped strap connector end cap 22 has a bore 22a through its central axis providing a bearing surface for the boss portion 46 which is disposed in the bore 22a for rotation of the end cap 22 relative to the adapter 42. An elongated channel 23 extends diametrically on the exterior surface of the end cap 22 and provides a seat for one end portion of the flexible strap 14. A pair of diametrically opposed internally threaded taps 25 are provided provided in the channel for receiving the two plated screws 56 shown on the left of FIG. 2.

In this embodiment, the flexible strap 14 has a first diameter hole which encircles a part of the boss 46 and a pair of second, smaller diameter holes 14a and 14b at spaced-apart positions to correspond to the screw receiving taps in the channel 23.

When assembled the boss 46 extends out to the left of the surface of channel 23 to allow a retaining clip 27 to fit into a circumferential groove 41 in the boss 46 to retain the end cap in engagement with the adapter. An elongated aluminum clamp 37 fits into the channel 23 after the strap 14 is placed therein and is held to the end cap 22 by the screws 56.

The interior surface of end cap 22 (FIG. 3) is essentially a mirror image of the exterior surface of the adapter 42. Thus there is a substantially annular groove which mates the groove to define a ring-shaped cavity. A stop tab 64 projects inwardly toward the camera.

A helical spring 90 is disposed in the ring-shaped cavity and has an end 90b abutting the shoulder 61 of stop tab 45 projecting outwardly from the adapter 42 and an opposite end 90a abutting a shoulder 64a of the stop tab 64 projecting inwardly from the end cap 22.

When the strap 14 is raised into its carrying position and placed in tension by the weight of the camera, the end cap rotates clockwise about the axis shown in FIG. 2 and the adapter remains stationary. The stop tab 64 slides in the groove 49 of adapter 42 and its shoulder 64a acts against the end 90a of helical spring 90 which is compressed because its opposite end 20b is held stationary by the shoulder 61 of the stop tab 45. When the tension is removed from the strap 14 by releasing it or by lifting the camera with respect to the strap, the compressed spring 90 forces end cap 22 to rotate counterclockwise about the axis of the boss in the aspect of FIG. 2. The stop tab 64 rides in the groove 49 freely until it butts against the shoulder 62 of the stop tab 45 thereby stopping the rotation at a prefixed angle.

A third embodiment of the present invention is illustrated in FIG. 4. A fragment of the back side of the camera 10 is shown together with the eye connector 12. Rubber washer 34 fits over the eye connector 12 as in the other embodiments.

An aluminum adapter 70 includes a disk portion 71 and an integral boss 72 projecting outwardly from the camera. A bore 73 through the adapter 70 provides for mounting the adapter over the eye connector and an elongated brass pin 75 the length of which is less than the diameter of the boss, fits through a hole 78 in the boss wall, and threads into a diametrically opposed internally threaded bore (not shown) in the boss wall.

A stop pin 76 located radially near the periphery of the disk and circumferentially such that it is directly above the eye connector 12 after attachment of the adapter projects outwardly from the adapter 70.

A strap connector 80 has a disk portion 82, an integral, substantially U-shaped connecting bracket 84, a hub portion 86, an axial bore 87 providing a bearing surface for rotatable mounting over the boss, and a stop pin 88 located so that it engages stop pin 76 on the adapter after assembly when the end of strap 14 is held substantially upright.

In this third embodiment, the flexible strap has a buckle pin 11 and its end is looped around the connecting bracket 84 and the loop is secured by the buckle pin. A retaining clip 89 fits into an annular groove 79 in an exterior portion of the boss wall which projects through the bore 87 and secures the connection between the adapter 70 and the strap connector 80.

A helical spring 17 has a looped end 17a attached to the stop pin 88 and an opposite looped end 17b attached to the stop pin 76 and is carried by the hub portion 86.

When the strap 14 is in tension as when the strap is wrapped around the photographer's neck and the camera hangs, the end portion of strap 14 is upright, the two stop pins 76 and 88 are in engagement, and the spring is fully expanded and in considerable tension. When the camera is lifted and tension removed from the strap, the spring provides a force to rotate the strap connector about the axis of the boss in a clockwise direction as viewed in FIG. 4 until the spring 17 is no longer in tension which occurs after a rotation of somewhat greater than 180°. Thus the end of the strap automatically retracts to a position aligned with the side 4 of the camera body and does not immediate immeidate access to the hand controls of the camera.

It should be noted that a number of modifications can be made to the above-described embodiments within the scope of the present invention. For example, in these embodiments the boss is held stationary with respect to the camera and is journaled in a circular bearing surface in the rotatable strap connector. Alternatively, the boss can be provided in the strap connector for rotation relative to a stationary bearing surface provided in an adapter held stationary with respect to the camera. Furthermore, the direction of rotation of the strap connector relative to the adapter can be opposite from that described in these embodiments.

I claim:

1. An accessory for a camera having a pair of eye connectors on the camera body, which comprises:
    a carrying strap for the camera, the strap being elongated and flexible;
    means for urging the carrying strap to revolve around the camera in a preselected direction, which comprises a pair of strap retractor assemblies for pivotally connecting opposite end portions of the flexible strap to the camera body;
    each strap retractor assembly comprising an adapter; means for releasably attaching the adapter to a respective eye connector; a rigid strap connector attached to a respective end portion of the strap; means for rotatably mounting the strap connector to the adapter; a spring bias mechanism connected between the strap connector and the adapter for urging the strap connector to rotate in a preselected direction; and stop means for preventing rotation of the strap connector in the preselected direction beyond a prefixed relative angle.

2. An accessory according to claim 1 including a boss integral with each said adapters projecting outwardly from the camera and wherein the rigid strap connector includes a receptacle for rotatable mounting over the boss.

3. An accessory according to claim 2 wherein the stop means comprises a first stop on the adapter and disposed in the receptacle and a second stop on the strap connector projecting into the receptacle and rotatable into engagement with the first stop.

4. An accessory according to claim 3 wherein the spring bias mechanism includes a spiral spring having a stationary end attached to the adapter and a movable end attached to the strap connector.

5. An accessory according to claim 1 wherein the means for attaching the strap connector to the eye connector includes a resilient washer disposed between the camera body and the adapter for protecting the finished surface of the camera and an elongated pin disposed through the bore of the eye connector and releasably attached to the adapter.

6. A camera strap retractor for connecting a flexible strap to a conventional eye connector on a side of a camera body, which comprises an adapter for releasably connecting the strap retractor to the eye connector; a rigid strap connector for attaching an end portion of the flexible strap to the strap retractor; means for rotatably coupling the strap connector to the adapter comprising a boss movable with one of said strap connector and adapter defining an axis about which said end portion is pivotable and a receptacle movable with the other of said strap connector and adapter rotatably mounted on the boss; a spring bias mechanism connected between the strap connector and the adapter for normally rotating the strap connector so as to pivot said end portion in a preselected direction; and stop means for preventing rotation of the strap connector beyond a prefixed angular position.

7. A retractor according to claim 6 wherein the boss is on the adapter and the receptacle is on the strap connector.

8. A retractor according to claim 7 including a resilient washer disposed between the adapter and the camera body for protecting the finished surface of the camera body.

9. A retractor according to claim 6 wherein the stop means comprises a first stop on the adapter and disposed in the receptacle and a second stop on the strap connector projecting into the receptacle and rotatable into engagement with the first stop.

10. A carrying strap accessory for a camera having a pair of conventional eye connectors on the camera body, which comprises:
an elongated, flexible strap;
a pair of strap retractor assemblies for connecting opposite end portions of the flexible strap to the camera body;
each strap retractor assembly comprising an adapter; means for releasably attaching the adapter to a respective eye connector; a rigid strap connector attached to a respective end portion of the strap; means for rotatably mounting the strap connector to the adapter, which includes a boss movable with one of said strap connector and adapter and a receptacle movable with the other of said strap connector and adapter rotatably mounted on the boss; a spring bias mechanism connected between the strap connector and the adapter for urging the strap connector to rotate in a preselected direction; and means for preventing rotation of the strap connector beyond a prefixed angle, which includes a first stop on the adapter and disposed in the receptacle and a second stop on the strap connector projecting into the receptacle and rotatable into engagement with the first stop.

11. An accessory according to claim 10 wherein the spring bias mechanism includes a spiral spring having a stationary end attached to the adapter and a movable end attached to the strap connector.

* * * * *